United States Patent
McGill, Jr. et al.

(10) Patent No.: US 11,325,603 B2
(45) Date of Patent: May 10, 2022

(54) SYSTEMS AND METHODS FOR ESTIMATING LANE GEOMETRY

(71) Applicant: Toyota Research Institute, Inc., Los Altos, CA (US)

(72) Inventors: Stephen G. McGill, Jr., Broomall, PA (US); Guy Rosman, Newton, MA (US); Luke S. Fletcher, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 254 days.

(21) Appl. No.: 16/804,468

(22) Filed: Feb. 28, 2020

(65) Prior Publication Data
US 2021/0269035 A1   Sep. 2, 2021

(51) Int. Cl.
*G06K 9/00*   (2006.01)
*B60W 30/18*   (2012.01)

(52) U.S. Cl.
CPC ... *B60W 30/18163* (2013.01); *G06K 9/00798* (2013.01); *B60W 2300/36* (2013.01); *B60W 2420/52* (2013.01); *B60W 2552/53* (2020.02)

(58) Field of Classification Search
None
See application file for complete search history.

(56) References Cited

U.S. PATENT DOCUMENTS

| | | | |
|---|---|---|---|
| 8,340,894 B2 | 12/2012 | Yester | |
| 8,504,233 B1* | 8/2013 | Ferguson | G05D 1/0289 701/23 |
| 8,775,063 B2 | 7/2014 | Zeng | |
| 8,880,272 B1 | 11/2014 | Ferguson et al. | |
| 9,261,601 B2 | 2/2016 | Ibrahim | |
| 9,355,562 B1* | 5/2016 | Ferguson | G08G 1/20 |
| 9,460,622 B1 | 10/2016 | Ferguson et al. | |
| 11,023,753 B2* | 6/2021 | Vladimerou | G06K 9/6256 |
| 11,072,327 B2* | 7/2021 | Hardy | B60W 60/00276 |
| 2019/0258251 A1 | 8/2019 | Ditty et al. | |
| 2021/0300379 A1* | 9/2021 | Hackeloeer | G06K 9/00798 |

OTHER PUBLICATIONS

Eidehall et al., "Joint Road Geometry Estimation and Vehicle Tracking," Control Engineering Practice, 2007, pp. 1484-1494, found at https://www.sciencedirect.com/science/article/abs/pii/S0967066107000512 (11 pages).

(Continued)

*Primary Examiner* — Todd Melton
(74) *Attorney, Agent, or Firm* — Christopher G. Darrow; Darrow Mustafa PC

(57) ABSTRACT

Systems and methods for estimating lane geometry are disclosed herein. One embodiment receives sensor data from one or more sensors; detects a road agent based on the sensor data; detects, based on the sensor data, that the road agent has performed a lane shift from a first lane of a roadway to a second lane of the roadway; and estimates a boundary line between the first lane of the roadway and the second lane of the roadway based, at least in part, on the detected lane shift.

20 Claims, 6 Drawing Sheets

(56) References Cited

OTHER PUBLICATIONS

Alvarez et al., "Combining Priors, Appearance, and Context for Road Detection," IEEE Transactions on Intelligent Transportation Systems, vol. 15, No. 3, Jun. 2014, found at http://citeseerx.ist.psu.edu/viewdoc/download?doi=10.1.1.494.8597&rep=rep1&type=pdf.
Garcia-Fernandez et al., "Bayesian Road Estimation Using On-Board Sensors," IEEE, 2014, found at https://espace.curtin.edu.au/bitstream/handle/20.500.11937/9349/225729_225729.pdf?sequence=2 (15 pages).
Melo et al., "Detection and Classification of Highway Lanes Using Vehicle Motion Trajectories," IEEE Transactions on Intelligent Transportation Systems, vol. 7, No. 2, Jun. 2006, found at http://vislab.isr.ist.utl.pt/publications/06-IEEE-traffic.pdf (13 pages).
Nieto et al., "Road Environment Modeling Using Robust Perspective Analysis and Recursive Bayesian Segmentation," found at http://oa.upm.eS/10751/2/INVE_MEM_2011_78848.pdf (19 pages).
Tanzmeister et al., "Road Course Estimation in Unknown, Structured Environments," 2013 IEEE Intelligent Vehicles Symposium (IV), Jun. 23-26, 2013, Gold Coast, Australia, found at: https://ieeexplore.ieee.org/abstract/document/6629537 (6 pages).
Thomas et al., "Sensor-Based Road Model Estimation for Autonomous Driving," 2017 IEEE Intelligent Vehicles Symposium (IV), Jun. 11-14, 2017, Redondo Beach, CA, abstract linked at https://ieeexplore.ieee.org/abstract/document/7995962 (6 pages).

* cited by examiner

SYSTEMS AND METHODS FOR ESTIMATING LANE GEOMETRY

TECHNICAL FIELD

The subject matter described herein generally relates to vehicles and, more particularly, to systems and methods for estimating lane geometry.

BACKGROUND

In vehicular navigation, situations sometimes arise in which map data is unavailable, outdated, or otherwise in error. In such situations, a vehicle can generate its own map of the environment in the vicinity of the vehicle based on sensor data. Part of generating a map on the fly is estimating the geometry of the lanes of a roadway. This can include estimating roadway centerlines, roadway boundaries, lane midlines, lane boundary lines, and lane curvature.

SUMMARY

An example of a system for estimating lane geometry is presented herein. The system comprises one or more sensors, one or more processors, and a memory communicably coupled to the one or more processors. The memory stores a detection module including instructions that when executed by the one or more processors cause the one or more processors to receive sensor data from the one or more sensors. The detection module also includes instructions that when executed by the one or more processors cause the one or more processors to detect a road agent based on the sensor data. The detection module also includes instructions that when executed by the one or more processors cause the one or more processors to detect, based on the sensor data, that the road agent has performed a lane shift from a first lane of a roadway to a second lane of the roadway. The memory also stores an estimation module including instructions that when executed by the one or more processors cause the one or more processors to estimate a boundary line between the first lane of the roadway and the second lane of the roadway based, at least in part, on the detected lane shift.

Another embodiment is a non-transitory computer-readable medium for estimating lane geometry and storing instructions that when executed by one or more processors cause the one or more processors to receive sensor data from one or more sensors. The instructions also cause the one or more processors to detect a road agent based on the sensor data. The instructions also cause the one or more processors to detect, based on the sensor data, that the road agent has performed a lane shift from a first lane of a roadway to a second lane of the roadway. The instructions also cause the one or more processors to estimate a boundary line between the first lane of the roadway and the second lane of the roadway based, at least in part, on the detected lane shift.

In another embodiment, a method of estimating lane geometry is disclosed. The method comprises receiving sensor data from one or more sensors. The method also includes detecting a road agent based on the sensor data. The method also includes detecting, based on the sensor data, that the road agent has performed a lane shift from a first lane of a roadway to a second lane of the roadway. The method also includes estimating a boundary line between the first lane of the roadway and the second lane of the roadway based, at least in part, on the detected lane shift.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments described herein estimate lane geometry by analyzing the movement of detected road agents (e.g., vehicles, motorcycles, scooters, bicycles, etc.) based on sensor data. More specifically, a lane geometry estimation system estimates a boundary line between two lanes of a roadway based, at least in part, on a detected lane shift by a road agent from one of the two lanes to the other of the two lanes.

In one embodiment, detecting the lane shift includes tracking the trajectory of the detected road agent in relation to an estimated midline of the lane in which the detected road agent was traveling prior to the lane shift. In some embodiments, estimating the boundary line between the two lanes includes estimating that the boundary line lies approximately halfway between a first lateral position occupied by the road agent in the original lane and a second lateral position occupied by the road agent in the new lane upon completion of the lane shift. In another embodiment, estimating the boundary line between the two lanes includes estimating that the boundary line passes through a point of inflection of a trajectory traversed by the road agent during the lane shift. In yet another embodiment, the system estimates the boundary line between the two lanes by tracking the change in how rapidly the road agent deviates from an estimated midline of the original lane in which the road agent was traveling prior to the lane shift.

In some embodiments, an estimated boundary line between two lanes can be compared with earlier estimates of the same boundary line in an iterative fashion, the earlier estimates being based on detected lane shifts by other road agents.

Figure 1:
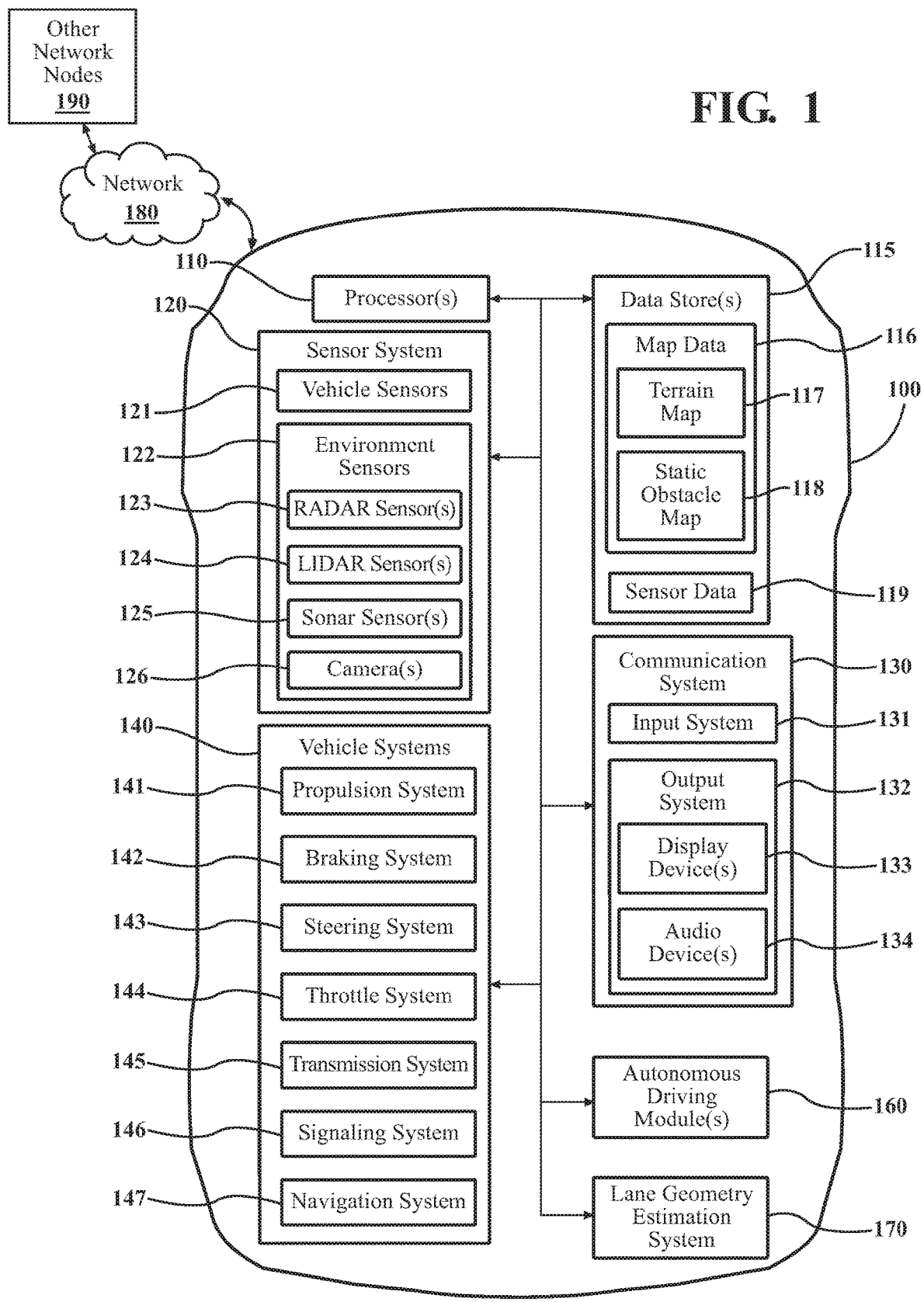
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. The vehicle 100 can include a lane geometry estimation system 170 or components and/or modules thereof. As used herein, a "vehicle" is any form of motorized transport. In one or more implementations, the vehicle 100 can be an automobile. In some implementations, the vehicle 100 may be any other form of motorized transport. In some embodiments, vehicle 100 is capable of operating in a semi-autonomous or fully autonomous mode. The vehicle 100 can include the lane geometry estimation system 170 or capabilities to support or interact with the lane geometry estimation system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including lane geometry estimation system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with other network nodes 190 (e.g., other vehicles, servers, etc.) via network 180.

Some of the possible elements of the vehicle 100 are shown in FIG. 1 and will be described in connection with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system, a global navigation satellite system (GNSS), or a global positioning system (GPS). Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126.

Figure 2:
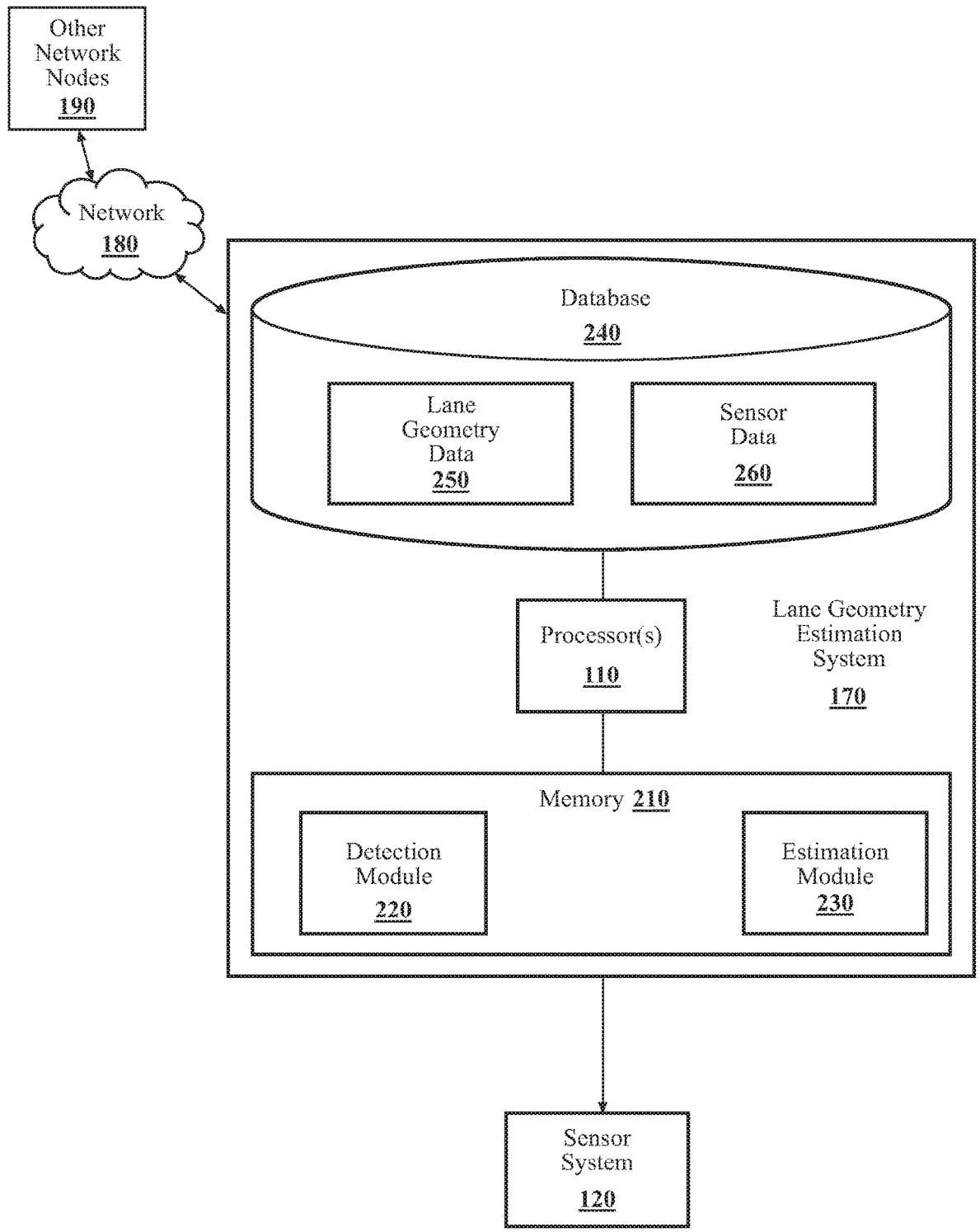
FIG. 2 illustrates one embodiment of lane geometry estimation system.

Referring to FIG. 2, one embodiment of the lane geometry estimation system 170 of FIG. 1 is further illustrated. In this embodiment, lane geometry estimation system 170 is shown as including one or more processors 110 from the vehicle 100 of FIG. 1. In general, the one or more processors 110 may be a part of lane geometry estimation system 170, lane geometry estimation system 170 may include one or more separate processors from the one or more processors 110 of the vehicle 100, or lane geometry estimation system 170 may access the one or more processors 110 through a data bus or another communication path, depending on the embodiment.

In one embodiment, memory 210 stores a detection module 220 and an estimation module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein.

As shown in FIG. 2, lane geometry estimation system 170 can communicate with one or more other network nodes 190 via network 180. The other network nodes 190 can include, for example, other vehicles (e.g., via direct vehicle-to-vehicle communication), cloud servers, or infrastructure systems such as roadside units (RSUs) and traffic signals. Lane geometry estimation system 170 can also communicate with sensor system 120 (refer to FIG. 1) to receive various types of sensor data 260, which can be stored in a database 240. In connection with estimating lane geometries, lane geometry estimation system 170 can store various types of lane geometry data 250 in database 240.

Lane geometry estimation system 170 analyzes position and velocity data from road agents, along with tangent vectors relating to lanes, to refine estimates of where the lanes of a roadway are. The system exploits properties such as lanes in which two vehicles are traveling next to each other, the lanes having the same curvature. In general, the tangent vectors and positions of vehicles near one another can be compared over time to infer lane widths (based on the assumption that each vehicle travels along a trajectory approximately coinciding with the midline of its lane). Depending on the embodiment, the estimation of lane geometries can be carried out using a model-based approach or using a machine-learning-based approach. In a machine-learning-based embodiment, techniques such as convolutional neural networks (CNNs) and/or long short-term memory (LSTM) networks can be employed.

At the simplest level, lane geometries can be represented as a set of waypoints and their associated tangent vectors to describe the roadway centerline, roadway boundaries, lane midlines or centerlines, and lane boundary lines. In some embodiments, lane geometries can be modeled in a parametric fashion through, e.g., the use of Bezier curves.

In some embodiments, it is presumed that no map data is available. In other embodiments, outdated or otherwise at least partially erroneous map data is available. In still other embodiments, up-to-date but low-resolution navigational map data is available that lacks detailed lane geometries. The techniques described herein can be combined, in some embodiments, with such low-resolution map data.

Detection module 220 generally includes instructions that cause the one or more processors 110 to receive sensor data 260 from one or more sensors in sensor system 120. As discussed above, these sensors can include, without limitation, image sensors (e.g., cameras) 126, radar sensors 123, and LIDAR sensors 124. Detection module 220 also includes instructions that cause the one or more processors 110 to detect a road agent based on the sensor data 260. In detecting road agents, detection module 220 can employ various machine-vision techniques for object detection and identification/recognition, including semantic segmentation and/or instance segmentation. Detection module 220 also includes instructions that cause the one or more processors 110 to detect, based on the sensor data 260, that the road agent has performed a lane shift (also sometimes called a "lane change") from a first lane of a roadway to a second lane of the roadway. In many circumstances, though not necessarily all, the first lane (original lane) and the second lane (new lane) are adjacent lanes with a boundary line (typically a dashed line painted on the roadway) dividing the two lanes. It is the estimation of this boundary line between the two adjacent lanes that is of particular interest, in the embodiments described herein.

Once a road agent has been detected, detection module 220 can track the trajectory of the detected road agent relative to an estimated midline (or centerline) of the lane in which the road agent is traveling. The midline of a given lane can be estimated based on available sensor data 260 relating to the roadway itself (e.g., images of the roadway) and/or the movement of one or more detected road agents. In one embodiment, detection module 220 detects a lane shift by the detected road agent by detecting a deviation of the road agent's orientation or heading relative to the midline of the lane in which the road agent is traveling. This is illustrated in FIG. 3.

Figure 3:
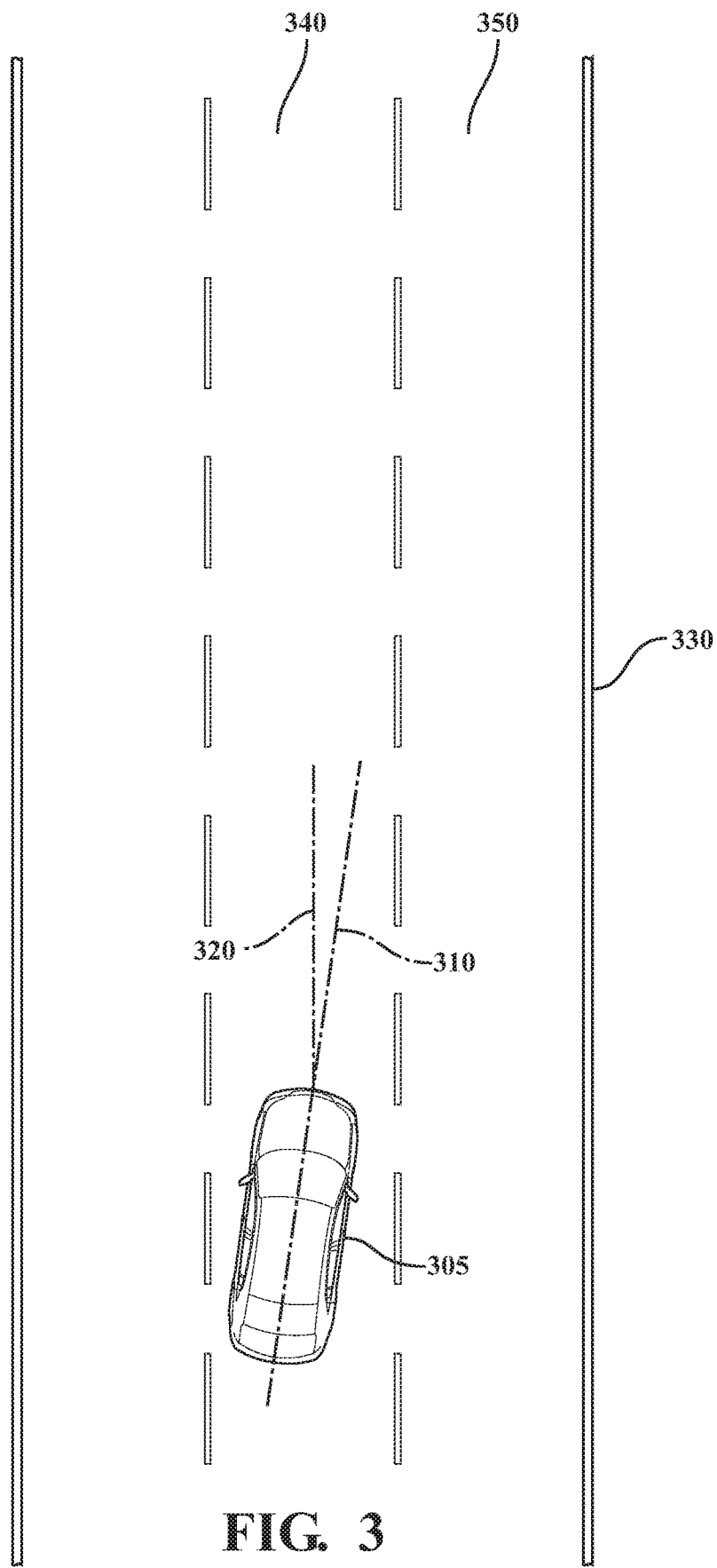
FIG. 3 illustrates an example of detecting a lane shift by a road agent, in accordance with an illustrative embodiment of the invention.

FIG. 3 illustrates an example of detecting a lane shift by a road agent 305, in accordance with an illustrative embodiment of the invention. In the example of FIG. 3, a detected road agent 305 is traveling in (original) lane 340 of a roadway 330. FIG. 3 represents an instant in time at which road agent 305 is beginning to execute a lane shift into new lane 350 (the adjacent lane to the right of original lane 340). Detection module 220 has estimated the heading or orientation of road agent 305, as indicated by the heading line 310 in FIG. 3. Detection module 220 has also estimated the midline of original lane 340, as indicated by midline 320 in FIG. 3. The angle formed between heading line 310 and midline 320 indicates that road agent 305 is likely in the process of executing a lane shift. Detection module 220 can confirm the lane shift by road agent 305 by continuing to track the trajectory of the detected road agent 305 over time.

Estimation module 230 generally includes instructions that cause the one or more processors 110 to estimate a boundary line between the first (original) lane of the roadway and the second (new) lane of the roadway based, at least in part, on the detected lane shift by the road agent 305. This estimation of the boundary line can be done in different ways, depending on the particular embodiment. Two representative embodiments are illustrated in FIGS. 4 and 5.

Figure 4:
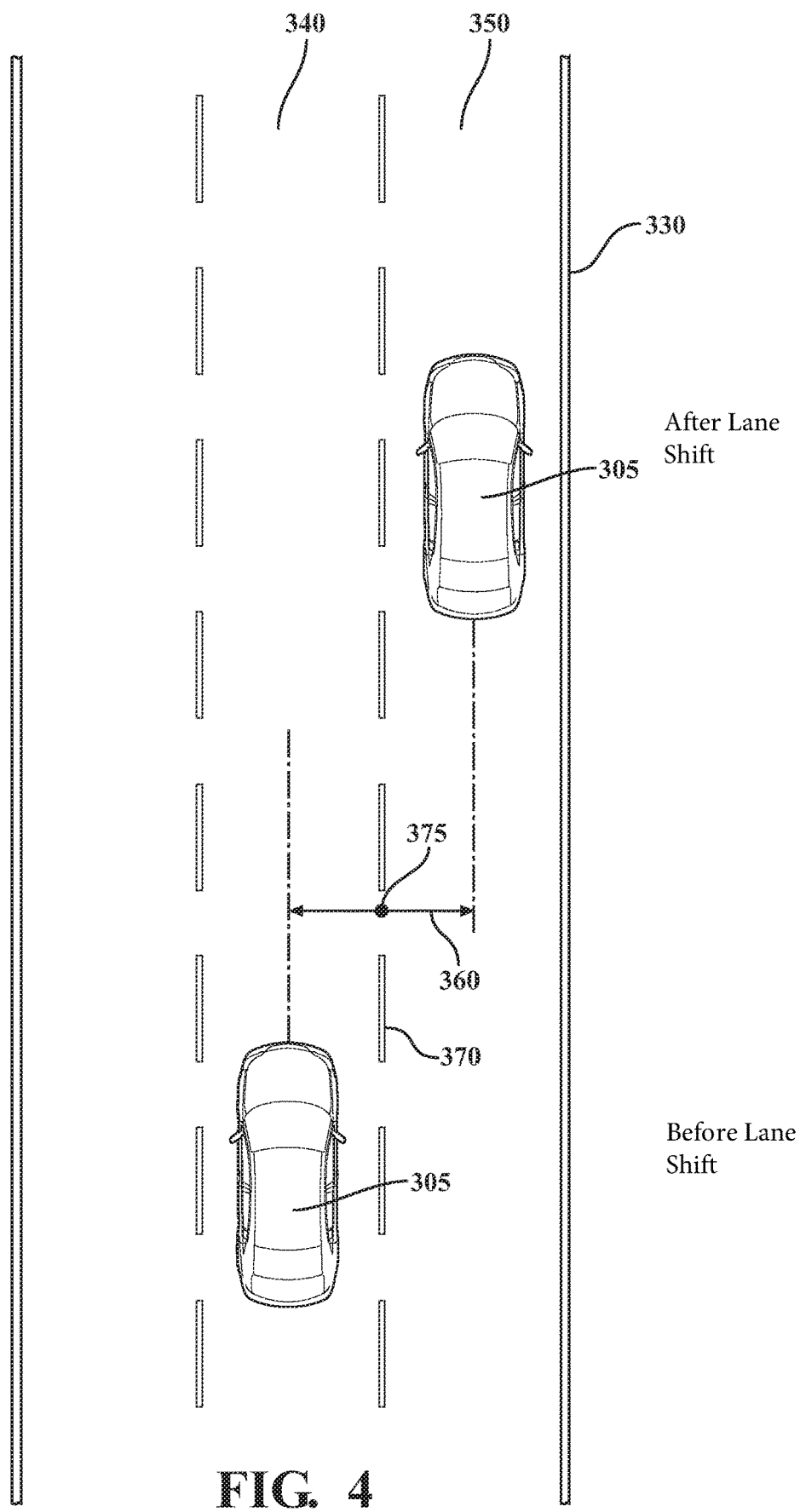
FIG. 4 illustrates estimating a boundary line between two lanes, in accordance with an illustrative embodiment of the invention.

FIG. 4 illustrates estimating a boundary line between two lanes, in accordance with an illustrative embodiment of the invention. In FIG. 4, a detected road agent 305 is shown at two different positions, one before the road agent 305 executes a lane shift (bottom of FIG. 4) and another after road agent 305 has executed the lane shift (top of FIG. 4). In this example, road agent 305 shifts from original lane 340 to new lane 350. Original lane 340 and new lane 350 are separated by a lane boundary line 370. Based on sensor data 260, estimation module 230, in this embodiment, estimates the change in lateral position 360—the difference between an initial lateral position in the original lane 340 and a final lateral position in the new lane 350. This change in lateral position 360 is in a direction orthogonal to the direction of travel, as illustrated in FIG. 4. In this embodiment, estimation module 230 estimates that lane boundary line 370 lies approximately halfway between the initial and final lateral positions of road agent 305. That is, estimation module 230 estimates that the boundary line 370 lies halfway between the initial lateral position occupied by the road agent 305 in original lane 340 prior to the lane shift and the final lateral position occupied by the road agent 305 in new lane 350 upon completion of the lane shift. This halfway point is indicated as point 375 in FIG. 4. Lane boundary line 370 can thus be estimated as a line that passes through point 375 and that runs parallel to the detected direction of travel of road agent 305.

Figure 5:
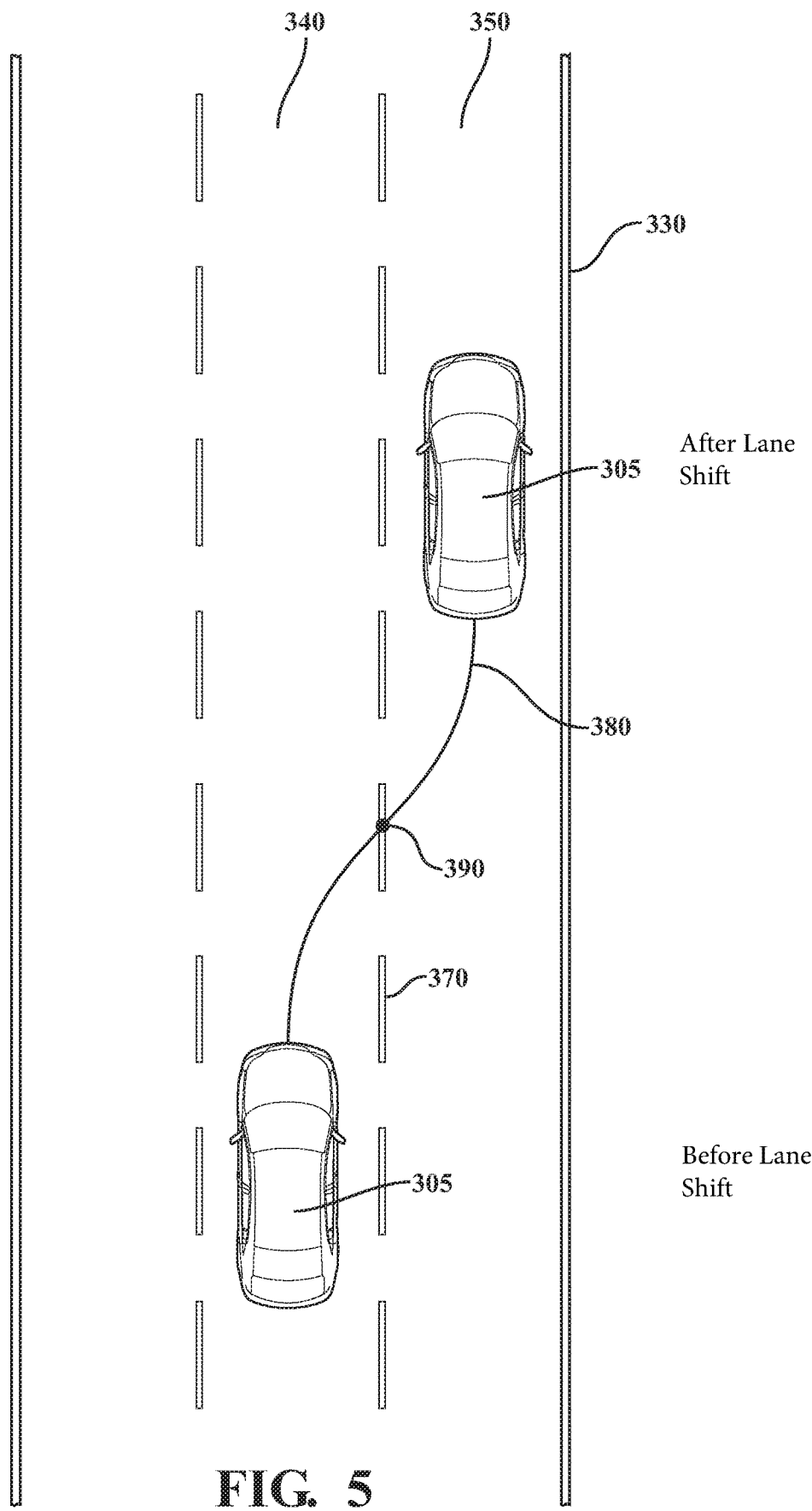
FIG. 5 illustrates estimating a boundary line between two lanes, in accordance with another illustrative embodiment of the invention.

FIG. 5 illustrates estimating a boundary line 370 between two lanes (340 and 350), in accordance with another illustrative embodiment of the invention. In the embodiment shown in FIG. 5, estimation module 230 tracks the lane-shift trajectory 380 of road agent 305—the trajectory road agent 305 traverses in executing the lane shift from original lane 340 to new lane 350. Estimation module 230 can then identify a point of inflection 390 along the lane-shift trajectory 380. That point of inflection 390 is the approximate location at which lane-shift trajectory 380 intersects lane boundary line 370. In this embodiment, estimation module 230 estimates that the boundary line 370 passes through the point of inflection 390 of the lane-shift trajectory 380 traversed by the road agent 305 during the lane shift. Lane boundary line 370 can thus be estimated as a line that passes through the point of inflection 390 and runs parallel to the detected direction of travel of road agent 305.

In yet another embodiment, the estimation module 230 estimates the boundary line 370 between the two lanes (340 and 350) by tracking the change in how rapidly the road agent 305 deviates from an estimated midline 320 of the original lane 340 in which the road agent 305 was traveling prior to the lane shift.

How the estimated lane boundary line 370 is used by lane geometry estimation system 170 can vary, depending on the embodiment. In one embodiment, the estimate of lane boundary line 370 is used in connection with generating a digital map. Such a map can be used for a variety of applications, including cut-in detection and other collision-avoidance applications. Knowing where the lane boundary line 370 is located helps a cut-in-detection algorithm determine whether another road agent is about the enter an ego vehicle's lane.

In some embodiments, the estimate of lane boundary line 370 produced by estimation module 230 is stored for later comparison with earlier estimates of the same boundary line generated in connection with the detection of lane shifts by one or more other road agents. That is, in these embodiments, estimation module 230 compares the estimated boundary line 370 with a prior estimated boundary line generated, at least in part, through the detection of a different lane shift by a different road agent. In some embodiments, this process can be repeated iteratively in a filter-like fashion, the result of the iterative process converging to a more refined estimate of lane boundary line 370.

Figure 6:
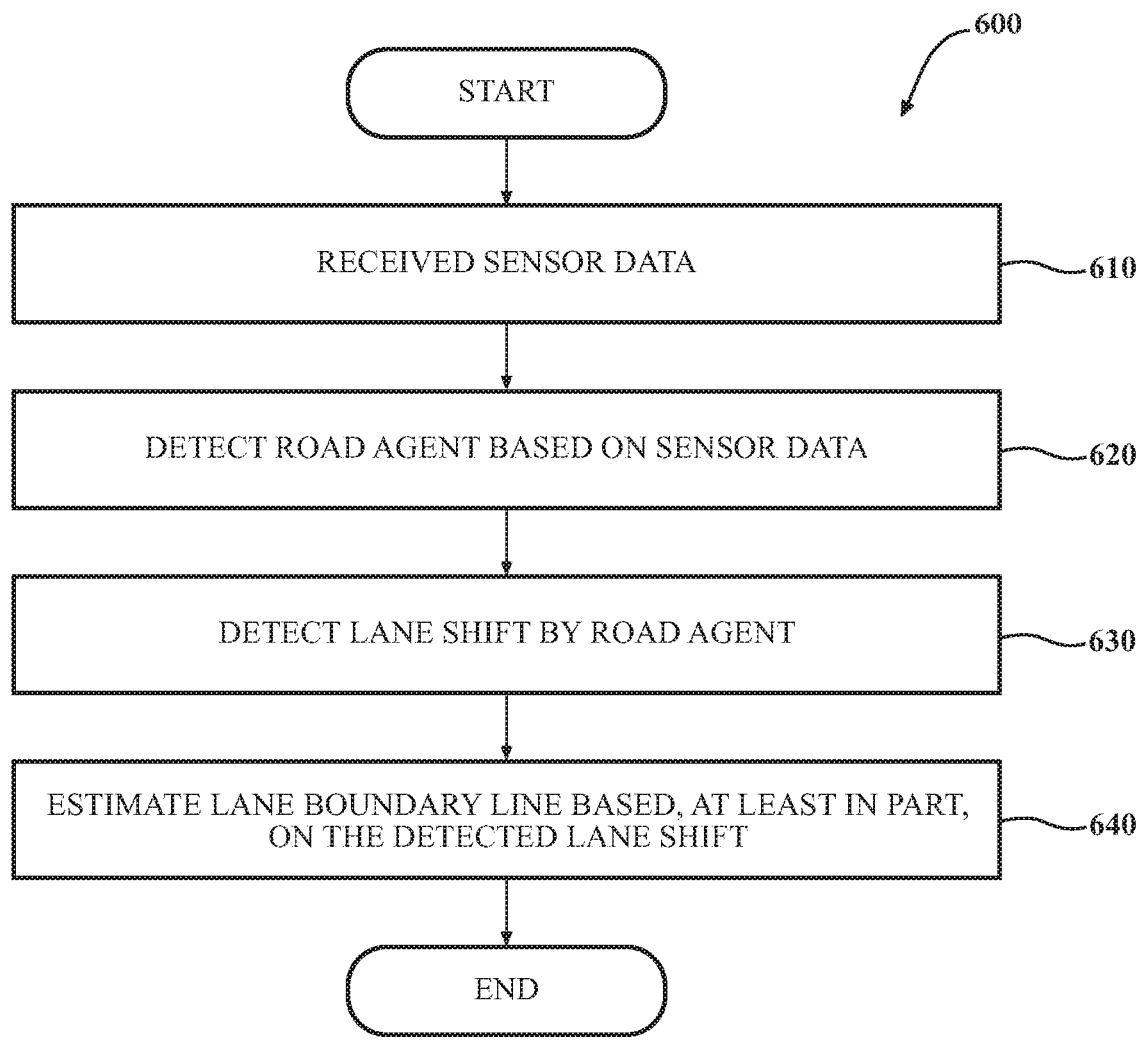
FIG. 6 is a flowchart of a method of estimating lane geometry, in accordance with an illustrative embodiment of the invention.

FIG. 6 is a flowchart of a method 600 of estimating lane geometry, in accordance with an illustrative embodiment of the invention. Method 600 will be discussed from the perspective of lane geometry estimation system 170 in FIG. 2 with reference, also, to FIGS. 3-5. While method 600 is discussed in combination with lane geometry estimation system 170, it should be appreciated that method 600 is not limited to being implemented within lane geometry estimation system 170, but lane geometry estimation system 170 is instead one example of a system that may implement method 600. Note that some embodiments include additional actions that are not shown in FIG. 6. Those additional actions are discussed below following the discussion of FIG. 6.

At block 610, detection module 220 receives sensor data 260 from one or more sensors in sensor system 120. As discussed above, the sensors can include one or more of cameras 126, radar sensors 123, and LIDAR sensors 124.

At block 620, detection module 220 detects a road agent 305 based on the sensor data 260. As discussed above, in detecting road agents, detection module 220 can employ various machine-vision techniques for object detection and identification/recognition, including semantic segmentation and/or instance segmentation.

At block 630, detection module 220 detects, based on the sensor data 260, that the road agent 305 has performed a lane shift from a first lane of a roadway (original lane 340) to a second lane of the roadway (new lane 350). As discussed above, once a road agent 305 has been detected, detection module 220 can track the lane-shift trajectory 380 of the detected road agent 305 in relation to an estimated midline 320 of the lane (340) in which the road agent 305 is traveling. The midline of a given lane can be estimated based on available sensor data 260 relating to the roadway itself (e.g., images of the roadway) and/or the movement of one or more detected road agents. Detection module 220 can detect a lane shift by the detected road agent by detecting a deviation of the road agent's orientation or heading 310 in relation to the midline 320 of the lane 340 (see FIG. 3).

At block 640, estimation module 230 estimates a boundary line 370 between the first lane of the roadway (original lane 340) and the second lane of the roadway (new lane 350) based, at least in part, on the detected lane shift. As discussed above, in one embodiment, estimation module 230 estimates that the boundary line 370 lies approximately halfway (see point 375 in FIG. 4) between a first lateral position occupied by the road agent 305 in the first lane of the roadway (original lane 340) prior to the lane shift and a second lateral position occupied by the road agent 305 in the second lane of the roadway (new lane 350) upon completion of the lane shift. As also discussed above, in another embodiment, estimation module 230 estimates that the boundary line 370 passes through a point of inflection 390 of a trajectory 380 traversed by the road agent 305 during the lane shift. In either embodiment, the lane boundary line 370 can be estimated as a line that intersects with the particular point (the halfway point or the point of inflection) and that the lane boundary line 370 runs parallel to the detected direction of travel of the detected road agent 305.

As mentioned above, in yet another embodiment, estimation module 230 estimates the boundary line 370 between the two lanes (340 and 350) by tracking the change in how rapidly the road agent 305 deviates from an estimated midline 320 of the original lane in which the road agent 305 was traveling prior to the lane shift.

In some embodiments, method 600 includes the additional action of comparing an estimated boundary line with a prior estimated boundary line generated, at least in part, through detection of a different lane shift by a different road agent, as discussed above. In some embodiments, this process can be repeated iteratively until an estimate of the boundary line 370 converges to a refined estimate.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect.

The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for estimating lane geometry, the system comprising:
   one or more sensors;
   one or more processors; and
   a memory communicably coupled to the one or more processors and storing:
      a detection module including instructions that when executed by the one or more processors cause the one or more processors to:
         receive sensor data from the one or more sensors;
         detect a road agent based on the sensor data; and
         detect, based on the sensor data, that the road agent has performed a lane shift from a first lane of a roadway to a second lane of the roadway; and
      an estimation module including instructions that when executed by the one or more processors cause the one or more processors to estimate a boundary line between the first lane of the roadway and the second lane of the roadway based, at least in part, on the detected lane shift.

2. The system of claim 1, wherein the instructions in the detection module to detect, based on the sensor data, that the road agent has performed the lane shift from the first lane of the roadway to the second lane of the roadway include instructions to track a trajectory of the road agent in relation to an estimated midline of the first lane of the roadway.

3. The system of claim 1, wherein the instructions in the estimation module to estimate the boundary line between the first lane of the roadway and the second lane of the roadway based, at least in part, on the detected lane shift include instructions to estimate that the boundary line lies halfway between a first lateral position occupied by the road agent in the first lane of the roadway prior to the lane shift and a second lateral position occupied by the road agent in the second lane of the roadway upon completion of the lane shift.

4. The system of claim 1, wherein the instructions in the estimation module to estimate the boundary line between the first lane of the roadway and the second lane of the roadway based, at least in part, on the detected lane shift include instructions to estimate that the boundary line passes through a point of inflection of a trajectory traversed by the road agent during the lane shift.

5. The system of claim 1, wherein the estimation module includes further instructions that when executed by the one or more processors cause the one or more processors to compare the estimated boundary line with a prior estimated boundary line generated, at least in part, through detection of a different lane shift by a different road agent.

6. The system of claim 1, wherein the one or more sensors include at least one of an image sensor, a radar sensor, and a Light Detection and Ranging (LIDAR) sensor.

7. The system of claim 1, wherein the road agent is one of a vehicle, a motorcycle, a scooter, and a bicycle.

8. A non-transitory computer-readable medium for estimating lane geometry and storing instructions that when executed by one or more processors cause the one or more processors to:
   receive sensor data from one or more sensors;
   detect a road agent based on the sensor data;
   detect, based on the sensor data, that the road agent has performed a lane shift from a first lane of a roadway to a second lane of the roadway; and
   estimate a boundary line between the first lane of the roadway and the second lane of the roadway based, at least in part, on the detected lane shift.

9. The non-transitory computer-readable medium of claim 8, wherein the instructions to detect, based on the sensor data, that the road agent has performed the lane shift from the first lane of the roadway to the second lane of the roadway include instructions to track a trajectory of the road agent in relation to an estimated midline of the first lane of the roadway.

10. The non-transitory computer-readable medium of claim 8, wherein the instructions to estimate the boundary line between the first lane of the roadway and the second lane of the roadway based, at least in part, on the detected lane shift include instructions to estimate that the boundary line lies halfway between a first lateral position occupied by the road agent in the first lane of the roadway prior to the lane shift and a second lateral position occupied by the road agent in the second lane of the roadway upon completion of the lane shift.

11. The non-transitory computer-readable medium of claim 8, wherein the instructions to estimate the boundary line between the first lane of the roadway and the second lane of the roadway based, at least in part, on the detected lane shift include instructions to estimate that the boundary line passes through a point of inflection of a trajectory traversed by the road agent during the lane shift.

12. The non-transitory computer-readable medium of claim 8, further comprising instructions to compare the estimated boundary line with a prior estimated boundary line generated, at least in part, through detection of a different lane shift by a different road agent.

13. The non-transitory computer-readable medium of claim 8, wherein the one or more sensors include at least one of an image sensor, a radar sensor, and a Light Detection and Ranging (LIDAR) sensor.

14. A method of estimating lane geometry, the method comprising:
   receiving sensor data from one or more sensors;
   detecting a road agent based on the sensor data;
   detecting, based on the sensor data, that the road agent has performed a lane shift from a first lane of a roadway to a second lane of the roadway; and
   estimating a boundary line between the first lane of the roadway and the second lane of the roadway based, at least in part, on the detected lane shift.

15. The method of claim 14, wherein the detecting, based on the sensor data, that the road agent has performed the lane shift from the first lane of the roadway to the second lane of the roadway includes tracking a trajectory of the road agent in relation to an estimated midline of the first lane of the roadway.

16. The method of claim 14, wherein the estimating the boundary line between the first lane of the roadway and the second lane of the roadway based, at least in part, on the detected lane shift includes estimating that the boundary line lies halfway between a first lateral position occupied by the road agent in the first lane of the roadway prior to the lane shift and a second lateral position occupied by the road agent in the second lane of the roadway upon completion of the lane shift.

17. The method of claim 14, wherein the estimating the boundary line between the first lane of the roadway and the second lane of the roadway based, at least in part, on the detected lane shift includes estimating that the boundary line passes through a point of inflection of a trajectory traversed by the road agent during the lane shift.

18. The method of claim 14, further comprising comparing the estimated boundary line with a prior estimated boundary line generated, at least in part, through detection of a different lane shift by a different road agent.

19. The method of claim 14, wherein the one or more sensors include at least one of an image sensor, a radar sensor, and a Light Detection and Ranging (LIDAR) sensor.

20. The method of claim 14, wherein the road agent is one of a vehicle, a motorcycle, a scooter, and a bicycle.

* * * * *